United States Patent [19]

Holler

[11] Patent Number: 5,615,369
[45] Date of Patent: Mar. 25, 1997

[54] AUTOMATED DETECTION AND CORRECTION OF UNINITIALIZED VARIABLES

[75] Inventor: Anne M. Holler, San Jose, Calif.

[73] Assignee: Hewlett-Packard Company, Palo Alto, Calif.

[21] Appl. No.: 280,166

[22] Filed: Jul. 25, 1994

[51] Int. Cl.⁶ ........................................ G06F 9/45
[52] U.S. Cl. .......................... 395/709; 364/DIG. 1; 364/280.4; 364/265; 395/183.14
[58] Field of Search .............. 395/700, 183.11, 395/183.14

[56] References Cited

U.S. PATENT DOCUMENTS

| | | | |
|---|---|---|---|
| 4,595,981 | 6/1986 | Leung | 364/300 |
| 4,601,032 | 7/1986 | Robinson | 371/23 |
| 5,038,296 | 8/1991 | Sano | 364/513 |
| 5,210,859 | 5/1993 | Aoshima et al. | 395/575 |
| 5,339,238 | 8/1994 | Benson | 395/700 |
| 5,428,786 | 6/1995 | Sites | 395/700 |
| 5,429,793 | 7/1995 | Odnert et al. | 395/700 |

OTHER PUBLICATIONS

Czech. Z.J., "Efficient Implementation of Detection of Undefined variables", Computer Journal, vol. 31, No. 6, 1988, pp. 545–549.

Kempton, W., "Run–time detection of Undefined variables Considered Essential", Software Practice and Experience, vol. 20(4) Apr. 1990, pp. 391–402.

*Primary Examiner*—Kevin A. Kriess
*Assistant Examiner*—Kakali Chaki

[57] ABSTRACT

In a compiler within a computing system, user definition webs are built for local variables in a subroutine. For each user definition web in which a first local variable is used, if there is a use of the first local variable for which there is no definition on at least one path to an entry point of the subroutine, a definition of the local variable is inserted at every entry point of the subroutine from which the use can be reached. Further, in the preferred embodiment, for each user definition web in which a first local variable is used, if there is a use of the first local variable for which there is no definition on at least one path to an entry point of the subroutine and if no definition can reach the use, the web is reported as definitely undefined. For each user definition web in which a first local variable is used, if there is a use of the first local variable for which there is no definition and if a definition can reach the use, the web is reported as possibly undefined.

12 Claims, 3 Drawing Sheets

AUTOMATED DETECTION AND CORRECTION OF UNINITIALIZED VARIABLES

BACKGROUND

The present invention concerns handling of uninitialized local variables by a compiler which utilizes optimization. Particularly, the present invention provides for the detection and correction of uninitialized local variables in a subroutine.

Programs are generally written in a high level programming language. This high level language, often referred to as source code, is translated by a compiler program into an assembly language. The binary form of the assembly language, called object code, is the form of the code actually executed by a computer.

When writing source code for compilation, it is generally good programming protocol to make sure each local variable is correctly initialized before it is used. Many compilers, for example, those which do not optimize code or those which do not optimize code by assigning local variables to registers, will assign variables to stack memory locations initially containing zero (or some other acceptable value). This may allow compiled code to execute as the programmer intended, despite the failure to initialize certain local variables before they are used.

However, some optimizing compilers may assign variables to a register rather than to a stack memory location. This is done because object code executes faster when resources are stored in registers, rather than memory locations. Registers, however, due to their heavy usage, are much less likely to be initialized to zero or some other acceptable value. The result can be code which, when executed, can produce results which surprise a programmer who failed to initialize all local variables before their use.

At least one prior art source code processing tool has provided for the issuance of a warning when a local variable is found for which there cannot possibly be a reaching definition. See, for example, the tool "Lint" which is intended to detect flaws in source code and is distributed as part of the UNIX operating system (UNIX is a trademark of AT&T Bell Laboratories). However, this tool has no provision for adding a default definition when none is available. Moreover, no warning is output if a local variable is defined only on some of the reaching control flow paths.

SUMMARY OF THE INVENTION

In accordance with the preferred embodiment of the present invention, a compiler within a computing system includes a computer implemented method. User definition webs are built for local variables in a subroutine. For each user definition web in which a first local variable is used, if there is a use of the first local variable for which there is no definition on at least one path to an entry point of the subroutine, a definition of the local variable is inserted at every entry point of the subroutine from which the use can be reached. Further, in the preferred embodiment, for each user definition web in which a first local variable is used, if there is a use of the first local variable for which there is no definition on at least one path to an entry point of the subroutine and if no definition can reach the use, the web is reported as definitely undefined. For each user definition web in which a first local variable is used, if there is a use of the first local variable for which there is no definition on at least one path to an entry point of the subroutine and if a definition can reach the use, the web is reported as possibly undefined.

The preferred embodiment of the present invention provides for automatic detection of possibly uninitialized variables. Further, the insertion of initialized instructions into the generated object code enhances the utility of detecting uninitialized variables.

DESCRIPTION OF THE PREFERRED EMBODIMENT

Figure 1:
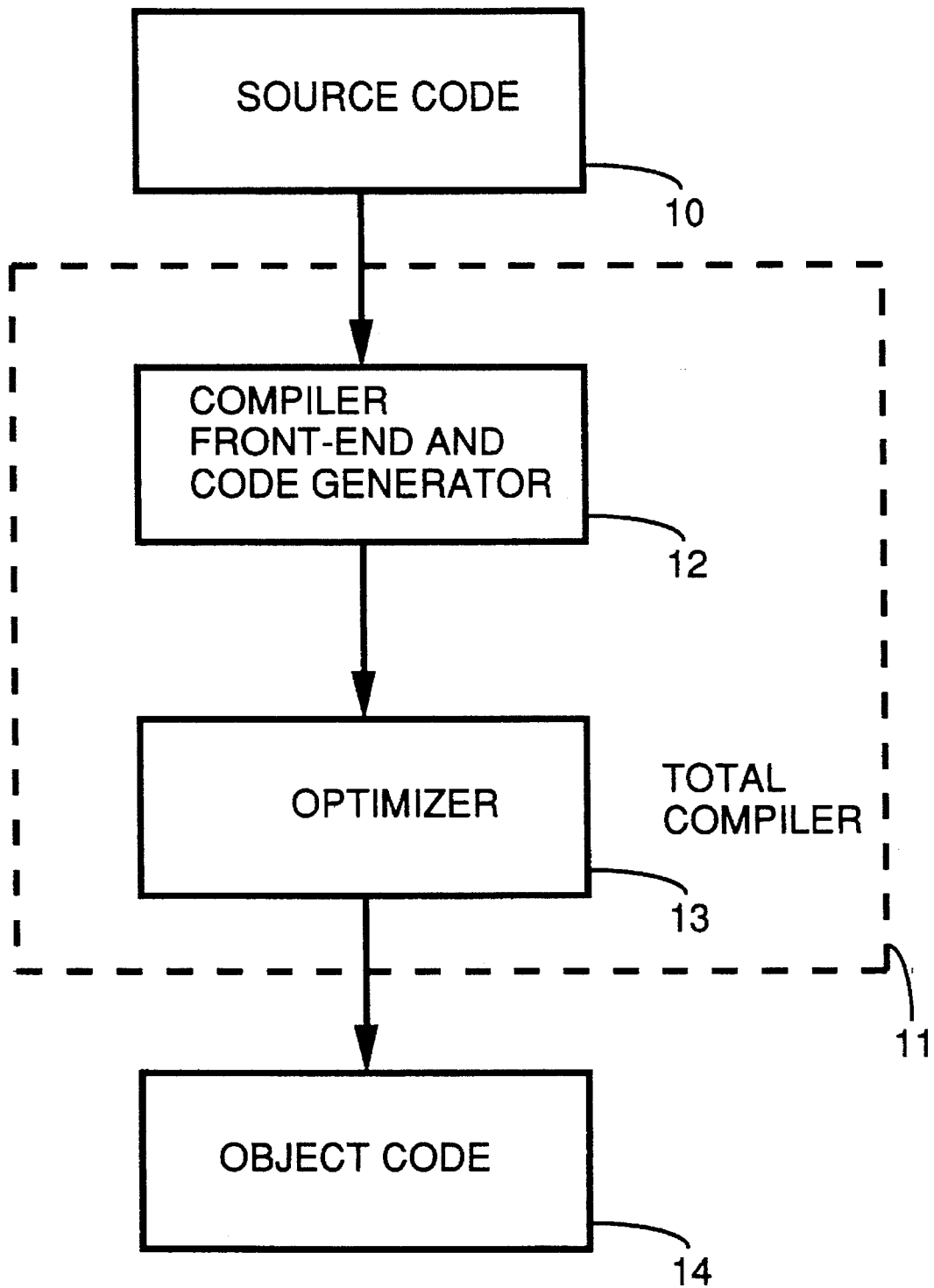
FIG. 1 shows a block diagram of an optimizing compiler.

FIG. 1 shows an optimizing compiler 11 used to compile source code 10 in order to produce object code 14. Compiler 11 includes a compiler 12 and an optimizer 13. The general principles of compiler design are readily available to practitioners in the art. For general information on compiler design see, for example, Alfred V. Aho, Ravi Sethi and Jeffrey D. Ullman, *Compilers: Principles, Techniques, and Tools*, Addison-Wesley Publishing Company, Reading, Mass., 1986.

Figure 2:
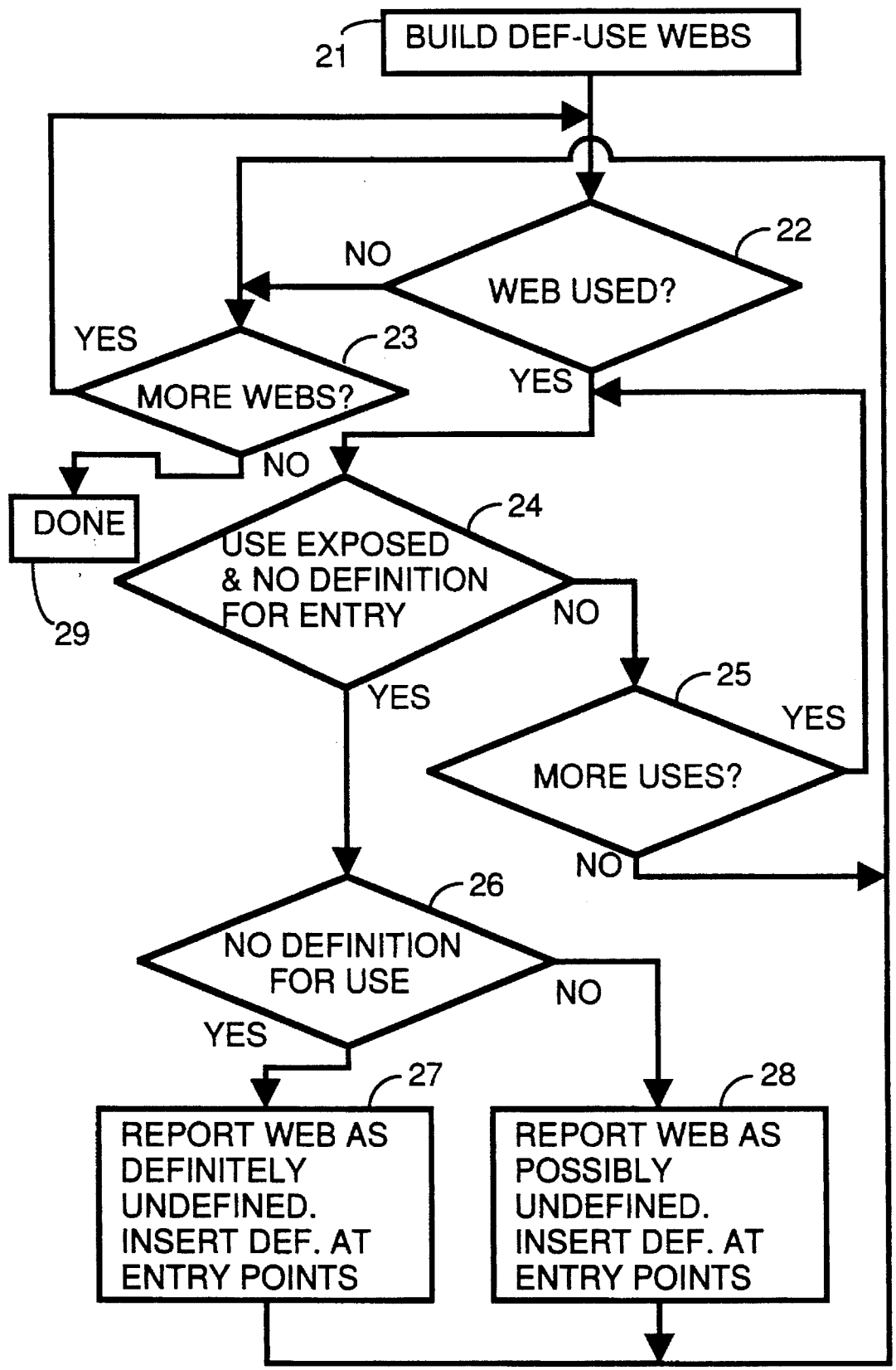
FIG. 2 shows a flowchart which describes automated detection and correction of uninitialized variables in accordance with the preferred embodiment of the present invention.

FIG. 2 shows a flowchart which shows how the ability to detect and correct uninitialized variables is incorporated into optimizer 13 in accordance with the preferred embodiment of the present invention. When a user has specified that the undefined variable warnings are to be given, the method shown in FIG. 2 is performed. In the preferred embodiment, provision is made so that the programmer can specify that the undefined variable warnings are not to be given and default definitions are not inserted.

In the method illustrated by FIG. 2, in a step 21, definition-use webs are built. What is meant by a definition-use web is a set of instructions which access a particular local variable. A web includes every instruction which defines or uses the local variable.

In step 22, a determination is made as to whether the web under consideration contains at least one use of the local variable. If the web contains at least one use, then each use of the web is evaluated in turn. In a step 24, for a first use of a local variable for the web under consideration, a determination is made as to whether the use is exposed to some entry point of the subroutine and no definition can reach this entry point. This determination may be made, for example, by ascertaining all paths from the use to an entry point of the subroutine. If, on at least one of these paths there is no definition, then the use is exposed to an entry point and no definition can reach this entry point. When the use is exposed to an entry point and no definition can reach this entry point, it is possible for the subroutine to be entered and the local variable to be used without the local variable being previously defined.

When in step 24, it is determined that the use is exposed to some entry point and no definition can reach this entry point, in a step 26, a determination is made as to whether no definition at all can reach this use. If this is the case, in a step 27, the web is reported to the user as definitely undefined. At every entry point for the use, a definition is inserted. When in step 26, it is determined that a definition can reach this use, in a step 28, the web is reported to the user as possibly undefined. At every entry point for the use, a definition is inserted. In the preferred embodiment, a definition is inserted at every entry point for the use. In alternate embodiments, a definition may be inserted at every entry point at which a definition does not already exist or every entry point from which a use is reached.

When in step 24, it is determined that a definition reaches every entry point to which the use is exposed, in a step 25, a determination is made as to whether there are more uses in the web. If so, step 26 is repeated for a new use of the web. If in step 25, a determination is made that there are no more uses in the web, in a step 23, a determination is made as to whether there are more webs which have not been checked. Likewise, after completion of step 27 or step 28, in step 23, a determination is made as to whether there are more webs which have not been checked. If there are more webs which have not be checked, step 22 is repeated for a new web. If in step 23 it is determined that there are no more webs which have not be checked, in a step 29, the process is complete.

Table 1 below gives abbreviated pseudo-code for the above described process.

TABLE 1

BUILD definition-use webs
FOR each web, do the following to detect if the web represents
  an undefined variable and to insert definition(s):
    IF user wants undefined variable warnings AND the web
      contains at least one use,
      FOR each use in web, use data flow information to
        determine these conditions:
          IF this use is exposed to some entry point AND no
            definition can reach entry
              IF no definition at all can reach this use
                Report web as definitely undefined
                Insert definition at every entry point
                Break out of FOR loop
              ELSE
                Report web as possibly undefined
                Insert definition at every entry point
                Break out of FOR loop
      END FOR each use in web
END FOR each web
END In order to illustrate operation of the preferred embodiment of the present invention, a sample program, written in FORTRAN, is given in Table 2 below.

TABLE 2

PROGRAM TRYTWO
    INTEGER Q
    COMMON Q
    Q = 45
    CALL TWOENTS
    CALL ENTRY2
    END
Comment: The following subroutine has two entry points:
TWOENTS and ENTRY2:
    SUBROUTINE TWOENTS
    INTEGER Q
    COMMON Q
    INTEGER X,Y,Z
Comment: X is definitely uninitialized at the time of its use below
    Y = 2*X
    WRITE (6,*) 'The value of Y at first entry is',Y
    RETURN
    ENTRY ENTRY2
    IF (Q .LT. 40)Z = 45
Comment: Z is conditionally uninitialized; it is uninitialized TABLE 2-continued if Q>=40
    Y = Z
    WRITE (6,*) The value of Y at second entry is ,Y
    RETURN
    END The above sample program contains a subroutine, TWOENTS, that has two entry points. Within the subroutine TWOENTS, the variable X is definitely undefined, and the variable Z is conditionally undefined.

A simplified description of the process relevant to the automatic detection and correction of uninitialized variables is given below.

Figure 3:
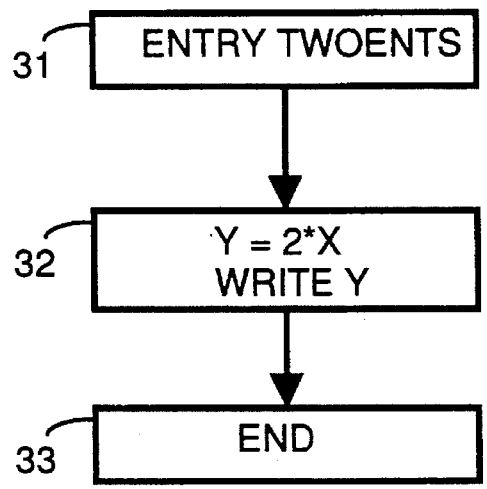
FIG. 3 shows flow of a subroutine from a program which is used to illustrate operation of the preferred embodiment of the present invention.
Figure 3:
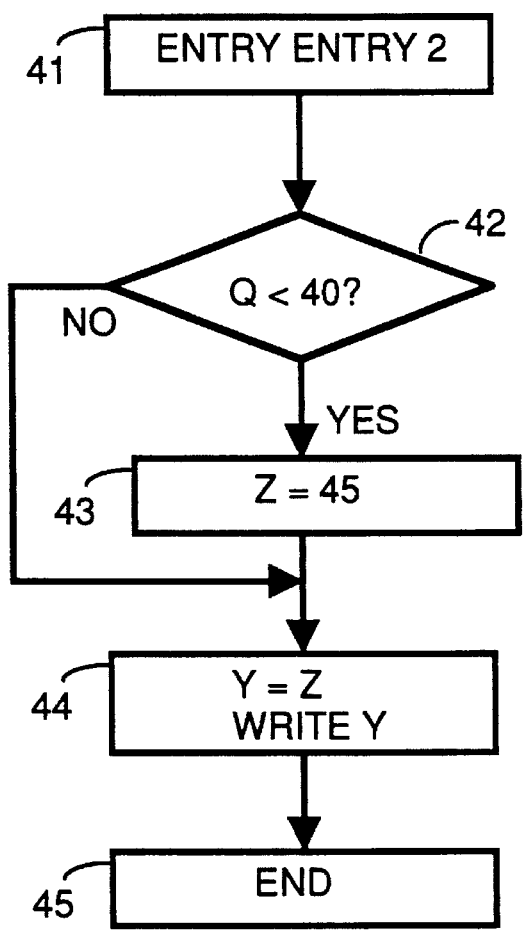

FIG. 3 shows flow for subroutine TWOENTS. In a step 31, the subroutine TWOENTS is entered. In a step 32, the local variable Y is calculated and written. In a step 33, the first block of subroutine TWOENTS ends.

In a step 41, the subroutine TWOENTS is entered at a second entry point ENTRY2. In a step 42, a branch is taken based on the value of the variable Q. In a step 43, a value is assigned to the local variable Z. In a step 44, the local variable Y is calculated and written. In a step 45, the second block of subroutine TWOENTS ends.

In accordance with step 21, shown in FIG. 2, definition use webs are built for the local variables X and Z of subroutine TWOENTS, as shown in Table 3 below:

TABLE 3 web X: {Use at step 32}
web Z: {Definition at step 43, Use at step 44}

When evaluating web X within subroutine TWOENTS, the determination in step 22 will be that the local variable X is used. The determination in step 25 on the first (and only) use of local variable X (In step 32 shown in FIG. 3) will be that there is an exposed use with no definition. The determination in step 26 will be that there is no definition for use. Therefore, in step 27, web X is reported to the user as definitely undefined. At every entry point for the use of web X, a definition is inserted.

When evaluating web Z within subroutine TWOENTS, the determination in step 22 will be that the web is used. The determination in step 25 on the first (and only) use of web Z (in step 34 shown in FIG. 3) will be that there is an exposed use with no definition. The exposed used occurs when Q is not less than 40. The determination in step 26 will be that there is a definition for the use. That is, there is a definition for the use of Z in step 44 when a determination is made in step 42 that Q is less than 40. Therefore, in step 28, web Z is reported to the user as possibly undefined. At every entry point for the use of Web Z, a definition is inserted.

The resulting code, with the definitions inserted for X and Z, is given in Table 4 below:

TABLE 4

PROGRAM TRYTWO
    INTEGER Q
    COMMON Q
    Q = 45
    CALL TWOENTS
    CALL ENTRY2
    END

TABLE 4-continued

```
Comment: The following subroutine has two entry points:
TWOENTS and ENTRY2:
        SUBROUTINE TWOENTS
        INTEGER Q
        COMMON Q
        INTEGER X,Y,Z
Comment: Definition for X and Z inserted below
        X = 0
        Z = 0
        Y = 2*X
        WRITE (6,*) 'The value of Y at first entry is',Y
        RETURN
        ENTRY ENTRY2
Comment: Definition for X and Z inserted below
        X = 0
        Z = 0
        IF (Q .LT. 40)Z = 45
        Y = Z
        WRITE (6,*) The value of Y at second entry is ,Y
        RETURN
        END
```

Compiling this program with a 10.0 FORTRAN compiler, which utilizes the preferred embodiment of the present invention, will result in the following two warnings: "Warning on line 16 of file.f: Uninitialized variable X in function TWOENTS (5004)" and "Warning on Line 22 of file.f: Variable Z in function TWOENTS may be uninitialized (5012)"

Running the compiled output of the program results in the output set out in Table 5 below:

TABLE 5

| The value of Y at first entry is 0 |
| --- |
| The value of Y at second entry is 0 |

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. In a compiler within a computing system, a computer implemented method comprising the steps of:
   (a) for local variables in a subroutine, building user definition webs, a first user definition web for a first variable including every instruction within the subroutine which defines or uses the first variable; and,
   (b) for the first user definition web when the first local variable is used at least once, performing the following substep:
      (b.1) if there is a use of the first local variable for which there is no definition on a path to an entry point of the subroutine, performing the following substeps:
         (b.1.1) if no definition can reach the use, report the web as definitely undefined, and
         (b.1.2) if a definition can reach the use, report the web as possibly undefined.

2. A method as in claim 1 wherein substep (b.1.1) includes, if no definition can reach the use, inserting a definition of the first local variable at every entry point of the subroutine; and wherein substep (b.1.2) includes, if a definition can reach the use, inserting a definition of the first local variable at every entry point of the subroutine.

3. A method as in claim 1 wherein substep (b.1.1) includes, if no definition can reach the use, inserting a definition of the first local variable at every entry point of the subroutine from which the use can be reached; and wherein substep (b.1.2) includes, if a definition can reach the use, inserting a definition of the first local variable at every entry point of the subroutine from which the use can be reached.

4. In a compiler within a computing system, a computer implemented method comprising the steps of:
   (a) for local variables in a subroutine, building user definition webs, a first user definition web for a first variable including every instruction within the subroutine which defines or uses the first variable; and,
   (b) for the first user definition web when the first local variable is used at least once, performing the following substep:
      (b.1) if there is a use of the first local variable for which there is no definition on a path to an entry point of the subroutine, performing the following substep:
         (b.1.1) inserting a definition of the first local variable at every entry point of the subroutine from which the use can be reached.

5. A method as in claim 4, wherein step (b) additionally comprises the following substep, performed for each user definition web in which the first local variable is used:
   (b.2) if there is a use of the first local variable for which there is no definition on a path to an entry point of the subroutine, performing the following substeps:
      (b.2.1) if no definition can reach the use, report the web as definitely undefined, and
      (b.2.2) if a definition can reach the use, report the web as possibly undefined.

6. A method as in claim 4 wherein substep (b.1.1) includes inserting a definition of the first local variable at every entry point of the subroutine.

7. Storage media which contains software which, when run on an appropriate computing system, performs a method within a compiler which comprises the steps of:
   (a) for local variables in a subroutine, building user definition webs, a first user definition web for a first variable including every instruction within the subroutine which defines or uses the first variable; and,
   (b) for the first user definition web when the first local variable is used at least once, performing the following substep:
      (b.1) if there is a use of the first local variable for which there is no definition on a path to an entry point of the subroutine, performing the following substeps:
         (b.1.1) if no definition can reach the use, report the web as definitely undefined, and
         (b.1.2) if a definition can reach the use, report the web as possibly undefined.

8. Storage media as in claim 7 wherein substep (b.1.1) includes, if no definition can reach the use, inserting a definition of the first local variable at every entry point of the subroutine; and wherein substep (b.1.2) includes, if a definition can reach the use, inserting a definition of the first local variable at every entry point of the subroutine.

9. Storage media as in claim 7 wherein substep (b.1.1) includes, if no definition can reach the use, inserting a definition of the first local variable at every entry point of the subroutine from which the use can be reached; and wherein substep (b.1.2) includes, if a definition can reach the use, inserting a definition of the first local variable at every entry point of the subroutine from which the use can be reached.

10. Storage media which contains software which, when run on an appropriate computing system, performs a method within a compiler which comprises the steps of:

(a) for local variables in a subroutine, building user definition webs, a first user definition web for a first variable including every instruction within the subroutine which defines or uses the first variable; and, (b) for the first user definition web when the first local variable is used at least once, performing the following substep:

(b.1) if there is a use of the first local variable for which there is no definition on a path to an entry point of the subroutine, performing the following substep:

(b.1.1) inserting a definition of the first local variable at every entry point of the subroutine from which the use can be reached.

11. Storage media as in claim 10, wherein step (b) additionally comprises the following substep, performed for each user definition web in which the first local variable is used:

(b.2) if there is a use of the first local variable for which there is no definition on a path to an entry point of the subroutine, performing the following substeps:

(b.2.1) if no definition can reach the use, report the web as definitely undefined, and (b.2.2) if a definition can reach the use, report the web as possibly undefined.

12. Storage media as in claim 10 wherein substep (b.1.1) includes inserting a definition of the first local variable at every entry point of the subroutine.

* * * * *